United States Patent
Cherkasova et al.

(10) Patent No.: US 7,610,381 B2
(45) Date of Patent: Oct. 27, 2009

(54) SYSTEM AND METHOD FOR EVALUATING A CAPACITY OF A STREAMING MEDIA SERVER FOR SUPPORTING A WORKLOAD

(75) Inventors: Ludmila Cherkasova, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1135 days.

(21) Appl. No.: 10/660,978

(22) Filed: Sep. 12, 2003

(65) Prior Publication Data

US 2005/0060389 A1  Mar. 17, 2005

(51) Int. Cl.
  *G06F 15/173* (2006.01)
(52) U.S. Cl. .................. 709/226; 709/223; 709/224
(58) Field of Classification Search .......... 709/226, 709/223, 224, 231, 233; 713/300; 718/101, 718/105
See application file for complete search history.

(56) References Cited

U.S. PATENT DOCUMENTS

| | | | |
|---|---|---|---|
| 5,461,415 A * | 10/1995 | Wolf et al. ............... 725/88 |
| 5,603,029 A | 2/1997 | Aman et al. |
| 5,732,239 A | 3/1998 | Togabi et al. |
| 5,734,119 A | 3/1998 | France et al. |
| 5,737,747 A * | 4/1998 | Vishlitzky et al. ........... 711/118 |
| 5,761,417 A * | 6/1998 | Henley et al. .............. 709/231 |
| 5,768,520 A * | 6/1998 | Dan et al. .................. 709/223 |
| 5,778,683 A * | 7/1998 | Drees et al. .................. 62/59 |
| 5,805,821 A * | 9/1998 | Saxena et al. ............... 709/231 |
| 5,815,662 A | 9/1998 | Ong |
| 5,953,707 A | 9/1999 | Huang et al. |
| 6,067,107 A | 5/2000 | Travaille et al. |
| 6,101,547 A | 8/2000 | Mukherjee et al. |
| 6,134,596 A * | 10/2000 | Bolosky et al. ............. 709/233 |
| 6,178,480 B1 | 1/2001 | Togabi et al. |
| 6,230,200 B1 * | 5/2001 | Forecast et al. ............. 709/226 |
| 6,263,361 B1 | 7/2001 | Hoyer et al. |
| 6,279,039 B1 | 8/2001 | Bhat et al. |
| 6,292,834 B1 | 9/2001 | Ravi et al. |
| 6,356,947 B1 | 3/2002 | Lutterschmidt |
| 6,389,510 B1 * | 5/2002 | Chen et al. .................. 711/113 |
| 6,401,126 B1 * | 6/2002 | Douceur et al. ............. 709/231 |
| 6,434,621 B1 | 8/2002 | Pezzillo et al. |
| 6,438,592 B1 | 8/2002 | Killian |
| 6,463,454 B1 * | 10/2002 | Lumelsky et al. ........... 718/105 |
| 6,516,350 B1 * | 2/2003 | Lumelsky et al. ........... 709/226 |
| 6,571,288 B1 | 5/2003 | Sarukkai |
| 6,594,699 B1 * | 7/2003 | Sahai et al. ................. 709/228 |
| 6,606,658 B1 | 8/2003 | Uematsu |
| 6,859,882 B2 * | 2/2005 | Fung ......................... 713/300 |
| 7,146,424 B2 * | 12/2006 | Douceur et al. ............. 709/231 |

(Continued)

OTHER PUBLICATIONS

U.S. Appl. No. 10/306,279, Cherkasova et al.

(Continued)

*Primary Examiner*—Ario Etienne
*Assistant Examiner*—Tae K Kim

(57) ABSTRACT

A method comprises receiving, into a capacity planning tool, configuration information for at least one streaming media server. The method further comprises receiving, into the capacity planning tool, workload information for a workload of client accesses of streaming media files from a server, and the capacity planning tool evaluating a capacity of the at least one streaming media server for supporting the workload.

30 Claims, 6 Drawing Sheets

U.S. PATENT DOCUMENTS

| | | | |
|---|---|---|---|
| 7,310,681 B2 * | 12/2007 | Cherkasova et al. | 709/233 |
| 7,424,528 B2 * | 9/2008 | Cherkasova et al. | 709/224 |
| 2001/0027479 A1 * | 10/2001 | Delaney et al. | 709/216 |
| 2002/0029273 A1 * | 3/2002 | Haroldson et al. | 709/226 |
| 2002/0062454 A1 * | 5/2002 | Fung | 713/300 |
| 2002/0083124 A1 | 6/2002 | Knox et al. | |
| 2002/0091722 A1 | 7/2002 | Gupta et al. | |
| 2002/0129048 A1 | 9/2002 | Qiu et al. | |
| 2002/0150102 A1 | 10/2002 | Janko et al. | |
| 2002/0156552 A1 | 10/2002 | Whiting | |
| 2003/0014464 A1 * | 1/2003 | Deverill et al. | 709/101 |
| 2003/0097443 A1 | 5/2003 | Gillett et al. | |
| 2003/0115244 A1 | 6/2003 | Molloy et al. | |
| 2004/0103189 A1 * | 5/2004 | Cherkasova et al. | 709/224 |

OTHER PUBLICATIONS

Cherkosova, L. et al., "Building a Performance Model of Streaming Media Applications in Utility Data Center Environment," Hewlett-Packard Laboratories, Internet Systems and Storage Lab, 12 pages.

Chase, J. et al., "Managing Energy and Server Resources in Hosting Centers," Dept. of Computer Science, Duke University, 14 pages.

Eager, D. et al., "Optimal and Efficient Merging Schedules for Video-on-Demand Servers," Proc. ACM Multimedia 1999, 4 pages.

Nahrstedt, K. et al., "A Probe-based Algorithm for QoS Specification and Adaptation," Univ. of Illinois at Urbana Champaign, pp. 1-12.

Nahrstedt, K. et al., "QoS-Aware Resource Managment for Distributed Multimedia Applications," Univ. of Illinois at Urbana Champaign, Dept. of Computer Science, pp. 1-37.

Ranjan, S. et al., "QoS-Driven Server Migration for Internet Data Centers," Proc. of IWQoS 2002, 10 pages.

U.S. Appl. No. 10/601,992, Cherkasova et al.

U.S. Appl. No. 10/601,956, Cherkasova et al.

Shenoy, P. et al., "Middleware versus Native OS Support: Architectural Considerations for Supporting Multimedia Applications," Univ. of Massachusetts, Dept. of Computer Science, 10 pages.

Acharya, S. et al., "Characterizing User Access To Videos On The World Wide Web," Part of the IS&T/SPIE Conference on Multimedia computing and Networking 2000, SPIE vol. 3969, 2000, pp. 130-141.

Almeida, J. et al., "Analysis of Educational Media Server Workloads," Proc. 11th Int'l. Workshop, 2001, 10 pages.

Dan, A. et al., "Buffering and Caching in Large-Scale Video Servers," IEEE 1995, pp. 217-224.

Kim, I. et al., "VBR Video Data Scheduling using Window-Based Prefetching," IEEE 1999, pp. 159-164.

Cherkasova, L. et al., "Characterizing Locality, Evolution, and Life span of Accesses in Enterprise Media Server Workloads," NOSSDAV '02, May 12-14, 2002, 10 pages.

* cited by examiner

| TIME | CONCURRENT CONNECTIONS | | | | | | | | | | |
|---|---|---|---|---|---|---|---|---|---|---|---|
| | 28Kb/s | | 56Kb/s | | 112Kb/s | | 256Kb/s | | 350Kb/s | | 500Kb/s |
| | MEMORY | DISK | MEMORY | DISK | MEMORY | DISK | MEMORY | DISK | MEMORY | DISK | MEMORY | DISK |
| ... $T_1$ ... | 2 | 1 | 0 | 2 | 3 | 0 | 6 | 1 | 5 | 0 | 8 | 2 |
| | | | | | | | ∘ ∘ ∘ | | | | | |

203

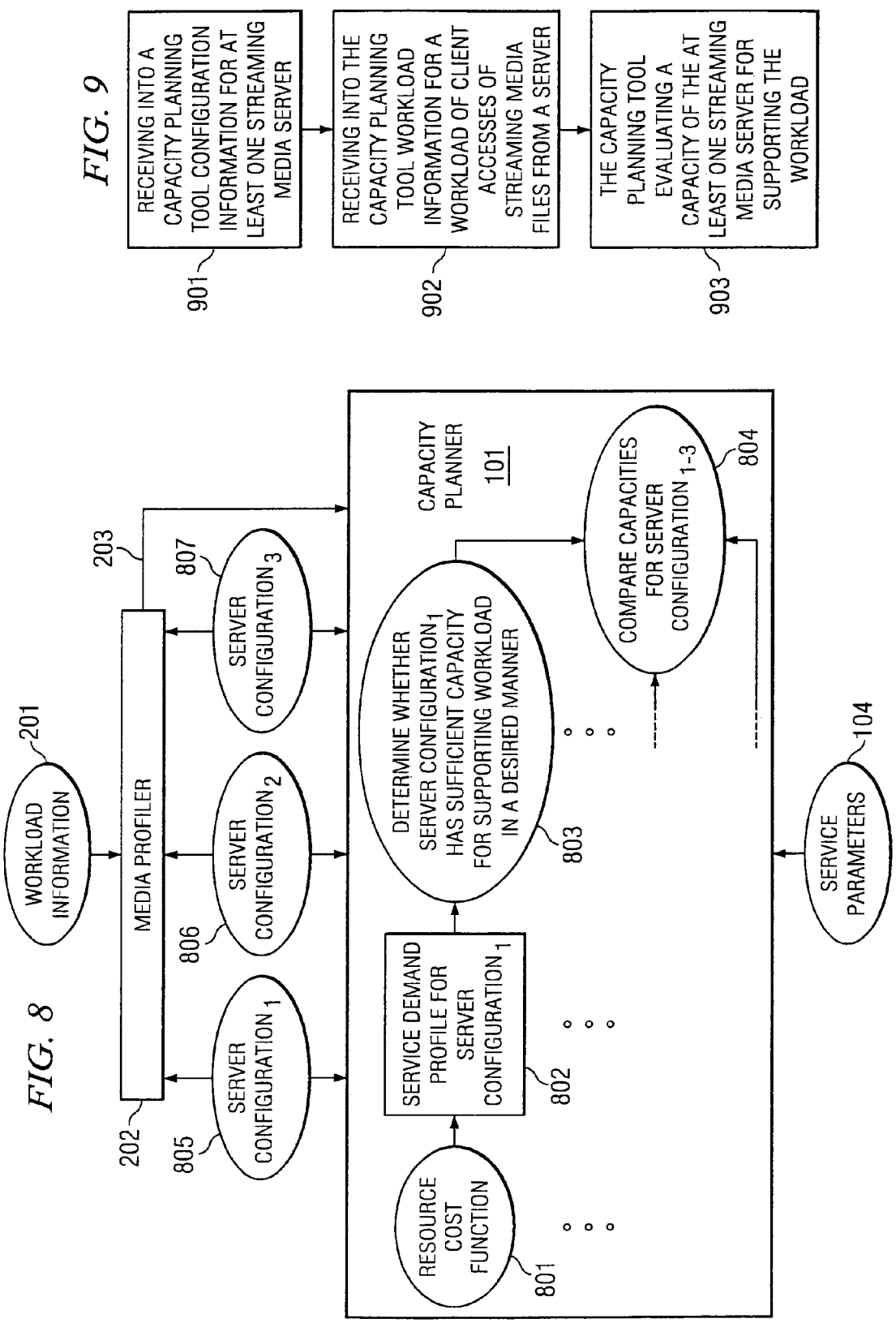

SYSTEM AND METHOD FOR EVALUATING A CAPACITY OF A STREAMING MEDIA SERVER FOR SUPPORTING A WORKLOAD

CROSS-REFERENCE TO RELATED APPLICATIONS

This application is related to the following patent applications: 1) U.S. patent application Ser. No. 10/306,279 filed Nov. 27, 2002 entitled "SYSTEM AND METHOD FOR MEASUFUNG THE CAPACITY OF A STREAMING MEDIA SERVER," now U.S. Pat. No. 7,424,528; 2) U.S. patent application Ser. No. 10/601,956 filed Jun. 23, 2003 entitled "SYSTEM AND METHOD FOR MODELING THE MEMORY STATE OF A STREAMING MEDIA SERVER," now U.S. Pat. No. 7,310,681; and 3) U.S. patent application Ser. No. 10/601,992 filed Jun. 23, 2003 entitled "COST-AWARE ADMISSION CONTROL FOR STREAMING MEDIA SERVER," now U.S. Publication No. 2004/0260619, the disclosures of which are hereby incorporated herein by reference.

FIELD OF THE INVENTION

The present invention relates in general to evaluating a capacity of a streaming media server for supporting a workload.

DESCRIPTION OF RELATED ART

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (e.g., a media server) to a client and begins playing on the client before fully downloaded.

Media servers are typically implemented for providing streaming media to clients. Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server for supporting a given "workload" (i.e., a number of concurrent client accesses of streaming media from the media server).

Streaming media service providers have traditionally had difficulty in evaluating whether a given media server configuration (e.g., a server having a certain size of memory, certain disk configuration, etc.) provides sufficient capacity for supporting the service providers' workload as desired. Thus, streaming media service providers have traditionally had difficulty in evaluating different media server configurations for capacity planning to, for example, determine the most cost-effective configuration that is capable of supporting the service providers' media service workload.

BRIEF SUMMARY OF THE INVENTION

According to at least one embodiment, a method comprises receiving, into a capacity planning tool, configuration information for at least one streaming media server. The method further comprises receiving, into the capacity planning tool, workload information for a workload of client accesses of streaming media files from a server, and the capacity planning tool evaluating a capacity of the at least one streaming media server for supporting the workload.

According to at least one embodiment, computer-executable software code stored to a computer-readable medium is provided. The computer-executable software code comprises code for receiving workload information for a workload of client accesses of streaming media files from a server, and code for evaluating a capacity of at least one system configuration for supporting the workload.

According to at least one embodiment, a system comprises means for receiving configuration information for a plurality of different system configurations. The system further comprises means for receiving workload information for a workload of client accesses of streaming media files from a server, and means for evaluating the capacity of each of the plurality of different system configurations for supporting the workload.

According to at least one embodiment, a method comprises receiving workload information identifying an expected workload of client accesses of streaming media files from a server. The method further comprises determining a service demand profile for at least one server configuration under evaluation for evaluating a capacity of the at least one server configuration for supporting the expected workload.

According to at least one embodiment, a system comprises a media profiler operable to receive a client access log collected over a period of time for a service provider's site and generate a workload profile for the service provider's site. The system further comprises a capacity evaluator operable to receive the generated workload profile and evaluate at least one server configuration's capacity for supporting the site's workload.

BRIEF DESCRIPTION OF THE DRAWINGS

FIG. 8 shows an example implementation of one embodiment for evaluating capacities of a plurality of different server configurations for handling an expected workload;

FIG. 9 shows an operational flow diagram of one embodiment for using a capacity planning tool for evaluating the capacity of one or more server configurations for supporting an expected workload;

DETAILED DESCRIPTION

Figure 1:
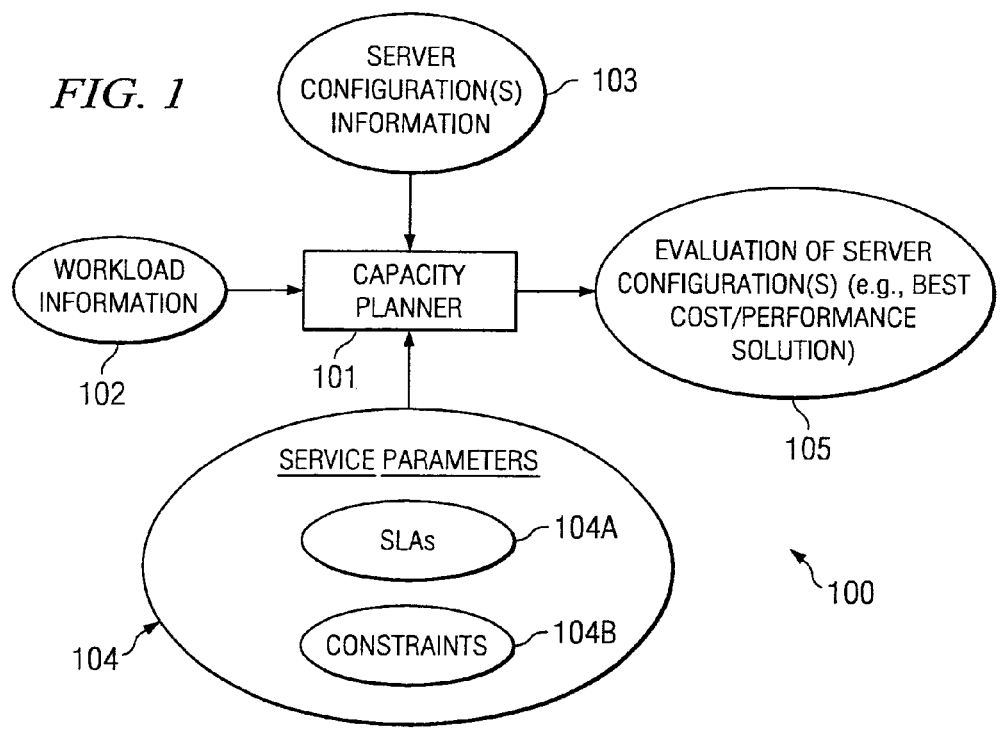
FIG. 1 shows a block diagram of an example embodiment of a capacity planning tool.

Various embodiments of a capacity planning tool (which may also be referred to herein as a "server configuration evaluator") are now described with reference to the above figures, wherein like reference numerals represent like parts throughout the several views. FIG. 1 shows a block diagram of an example embodiment of a capacity planning tool. As shown, system 100 includes capacity planner 101, which is capable of receiving input information regarding at least one server configuration and an expected (or "forecast") workload. Capacity planner 101 is further operable to make an evaluation of such server configuration(s) under the expected workload, as described further below.

For instance, in the example of FIG. 1, workload information 102 is received by capacity planner 101. Such workload information may comprise information about a workload of client accesses to one or more streaming media files being served by a media server. In certain implementations the workload information may be actual past access logs collected by a service provider, or it may be an estimated workload that is expected. For instance, media service providers typically collect media server access logs, which reflect processed client requests and client activities at the site. A log of client accesses over a past period of say, 3 months to a year, may provide a representative "view" of the service provider's regular workload, and thus may be used as an "expected" workload for the service provider. From such a log of client accesses, a determination can be made as to the number of concurrent client accesses to a streaming media file from a media server at any given point in the time period for which client accesses were logged. As described further below in conjunction with FIG. 2, in certain embodiments such access log information may be processed to generate a workload profile for the service provider, and the generated workload profile may be used by capacity planner 101 in evaluating a server configuration under consideration.

Further, capacity planner 101 may receive server configuration information (which may be referred to herein as "system configuration information"), such as configuration information 103 in the example of FIG. 1. Such server configuration information may comprise information about one or more configurations that may be employed for a media server, such as the respective memory size, disk configuration and speed, processor speed, bandwidth, etc. for a corresponding server configuration. In certain implementations, the server configuration information may also include monetary cost information (or "price") of a corresponding server configuration. Such monetary cost information may be used by capacity planner 101 in certain implementations for evaluating server configurations to determine a most cost-effective configuration that is capable of supporting the received workload in a manner desired by the service provider (e.g., in accordance with defined service parameters, such as those discussed further below).

As described further below, server configuration information 103 may include benchmark information, such as the benchmark information described in U.S. Pat. No. 7,424,528, filed Nov. 27, 2002 entitled "SYSTEM AND METHOD FOR MEASURING THE CAPACITY OF A STREAMING MEDIA SERVER." U.S. Pat. No. 7,424,528 discloses a set of benchmarks for measuring the basic capacities of streaming media systems. The benchmarks allow one to derive the scaling rules of server capacity for delivering media files which are: i) encoded at different bit rates, and ii) streamed from memory versus disk. As U.S. Pat. No. 7,424,528 further describes, a "cost" function can be derived from the set of basic benchmark measurements. This cost function may provide a single value to reflect the combined resource requirement such as CPU, bandwidth, and memory to support a particular media stream depending on the stream bit rate and type of access (e.g., memory file access or disk file access).

Further, capacity planner 101 may receive service parameters 104, which may include service level agreements (SLAs) $104_A$ and/or constraints $104_B$, as examples. Service parameters 104 define certain characteristics of the type of service desired to be provided by the service provider under the expected workload. For instance, SLAs $104_A$ may include information identifying at least one performance criteria for the service, such as the desired media server configuration is one capable of supporting the expected workload at least X% (e.g., 99%) of the time. For example, SLA $104_A$ may specify that when presented the expected workload, the desired server configuration is overloaded to the point that it is unable to support the number of concurrent streams that it is serving (thus degrading the quality of service of one or more of those streams) no more than 1% of the time. Constraints $104_B$ may include information restricting, for example, the amount of time that the desired media server configuration is at or near its capacity under the expected workload. For example, a constraint may be defined specifying that the media server configuration desired by the service provider is utilized under 70% of its capacity for at least 90% of the time under the expected workload. Such constraint may, for example, allow the service provider to define a certain amount of over-capacity into the desired server configuration to enable future growth of the workload to be supported by the server. The service parameters 104 may, in certain implementations, be variables that can be defined by a service provider.

Capacity planner 101 is operable to evaluate one or more server configurations, as may be identified by server configuration information 103, under the received workload 102, and capacity planner 101 outputs an evaluation 105 of such one or more server configurations. More specifically, evaluation 105 may include an evaluation of the capacity of the one or more server configurations under consideration for supporting the expected workload 102. For instance, such evaluation 105 may identify whether a given server configuration is capable of supporting workload 102 in accordance with the defined service parameters 104. Further, in certain implementations, evaluation 105 may provide a comparison of the capacities of various different server configurations for supporting the expected workload 102, as well as the monetary cost of each server configuration. From this information, a service provider may make an informed decision regarding the best server configuration to be implemented for supporting the service provider's future workload.

For evaluating the capacity of a server configuration under the expected workload, certain embodiments provided herein use a "cost" function for evaluating the amount of resources of the server configuration that are consumed under the workload. That is, in certain embodiments capacity planner 101 is operable to compute a "cost" in terms of server resources consumed for supporting the workload. This cost function, which is described further below in conjunction with the example of FIG. 2, may provide a single value to reflect the combined resource requirement such as CPU, bandwidth, and memory to support a particular media stream depending on the stream bit rate and type of access (e.g., memory file access or disk file access). Capacity planner 101 can evaluate the computed cost of a given server configuration to evaluate whether the server configuration can support the workload in accordance with the service parameters 104.

The ability to plan and operate at the most cost effective capacity provides a desirable competitive advantage for many streaming media service providers. Consider, for example, a scenario where a service provider, supporting a busy media site, faces a necessity to migrate the site to a new, more efficient infrastructure. For example, it may be determined that the service provider's current server configuration is unable to adequately support the service provider's regular workload, and thus a new server configuration is desired. The challenge becomes determining the optimal or most cost-effective infrastructure for the service provider to implement. On the one hand, the service provider typically desires to implement a server configuration that is capable of supporting the service provider's workload (at least for a majority of the time) such that a desired quality of service is maintained for the streams that it serves. However, the service provider also typically desires to minimize the monetary cost of the server configuration. Thus, the service provider typically does not wish to select a server configuration that will be capable of supporting the service provider's workload at a cost of $X dollars, while a server configuration that costs much less would be capable of supporting the service provider's workload just (or almost) as well. The service provider traditionally has no tool for evaluating the manner in which each of the server configurations being considered would support the service provider's expected workload. Thus, the service provider traditionally makes a relatively uninformed decision regarding which server configuration to implement for supporting the service provider's site.

Typically, the relationship between various server configurations and their respective abilities to support a service provider's workload is not fully understood or appreciated by the service provider, thereby making the decision of selecting a server configuration difficult. Accordingly, a capacity planning tool, such as capacity planner 101 of FIG. 1, that is capable of evaluating server configurations for a workload and provide feedback regarding the capacity of such configurations for supporting the workload and/or identifying the most cost-effective configuration is a beneficial tool for service providers.

Figure 2:
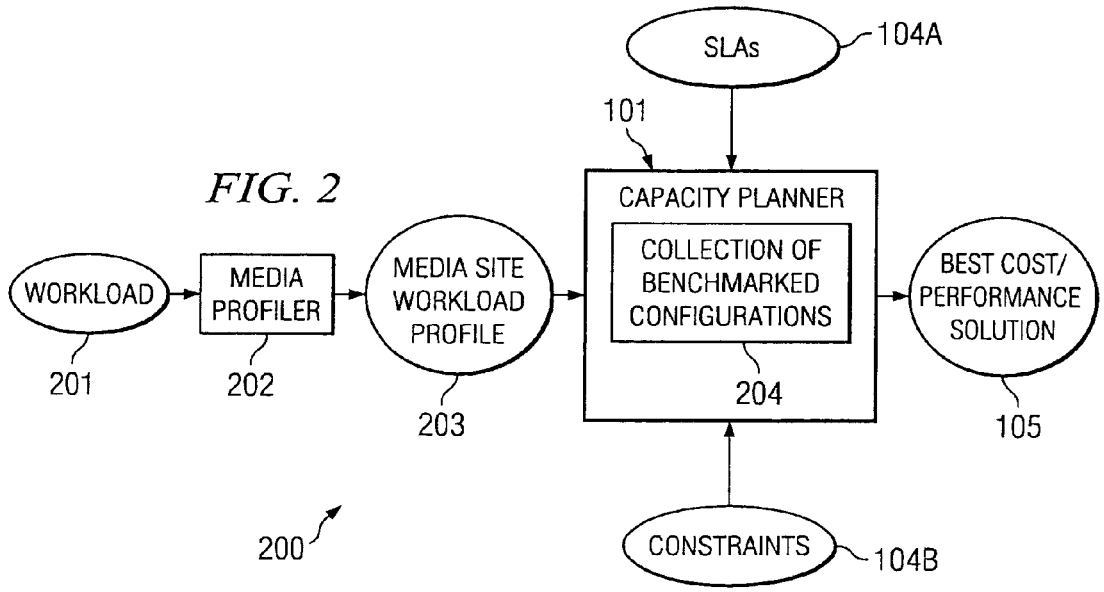
FIG. 2 shows a block diagram of another example embodiment of a capacity planning tool.

Turning to FIG. 2, a block diagram of another example embodiment of a capacity planning tool is shown. As with the example embodiment of FIG. 1, system 200 includes capacity planner 101, which may receive, as input, service parameters defining certain characteristics of the type of service desired to be provided by the service provider under the expected workload, such as SLAs $104_A$ and constraints $104_B$.

In the example of FIG. 2, a media profiler 202 (referred to herein as "MediaProf") is implemented. Such MediaProf 202 receives workload information 201 and generates a workload profile 203 for the service provider's workload. As mentioned above, media service providers typically collect media server access logs, which reflect processed client requests and client activities at the service provider's site. In the example of FIG. 2, workload 201 comprises such an access log (which may be from a single server or from a cluster of server's at the service provider's site) for an elapsed period of say, 3 months to a year. The access log may include information for any suitable elapsed period of time that is sufficiently long to provide a representative "view" of the service provider's regular (or typical) workload. MediaProf 202 receives this workload information (e.g., access log) 201 and processes such workload information 201 to generate a workload profile 203 for the service provider. Such workload profile 203 is then received by capacity planner 101 and used thereby for evaluating one or more server configurations under consideration. In certain implementations, MediaProf 202 processes the access log collected for a service provider's site to characterize the site's access profile and its system resource usage in both a quantitative and qualitative way in the workload profile 203. An example workload profile 203 that may be generated by MediaProf 202 is described further below in conjunction with FIG. 5.

In the example embodiment of FIG. 2, capacity planner 101 has the ability to measure and to compare the capacities of different media server configurations. More specifically, in this example embodiment capacity planner 101 uses a cost function for evaluating the capacities of various different server configurations under the workload. As mentioned above, a technique for measuring server capacity using a cost function is disclosed in co-pending U.S. Pat. No. 7,424,528. Also, a technique for measuring server capacity using a cost function is described by L. Cherkasova and L. Staley in "Building a Performance Model of Streaming Media Applications in Utility Data Center Environment", *Proc. of ACM/IEEE Conference on Cluster Computing and the Grid (CCGrid)*, May, 2003 (hereinafter referred to as "the L. Cherkasova Paper"), the disclosure of which is hereby incorporated herein by reference. The above references introduce a basic benchmark that can be used to establish the scaling rules for server capacity when multiple media streams are encoded at different bit rates. For instance, a basic benchmark may be executed for each of various different encoding bit rates for files stored at a media server.

A media server may comprise streaming media files that are encoded for transmission at each of a plurality of different bit rates. For example, a first streaming media file, "File A," may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage of the media server and the media server may be able to serve the appropriate one of such files as a stream to a client. In this case, the different encoded files comprise substantially the same content (i.e., the content of File A), but are encoded for transmission at different bit rates, and thus the quality of each file may differ. A media server generally attempts to serve the most appropriate encoded file to a client based at least in part on the client's access speed to the client-server network. For example, suppose a first client has a 28 Kb/s speed connection to the communication network (e.g., the Internet), a second client has a 56 Kb/s speed connection to the communication network 103, and a media server comprises File $A_1$ encoded at 28 Kb/s and File $A_2$ encoded at 56 Kb/s stored thereto; when the first client requests the content of File A, the media server typically attempts to serve File $A_1$ to this first client (as File $A_1$ is the highest-quality encoded file supportable by the first client's connection speed), and when the second client requests the content of File A, the media server typically attempts to serve File $A_2$ to this second client (as File $A_2$ is the highest-quality encoded file supportable by the second client's connection speed).

As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

As shown in the example of FIG. 2, capacity planner 101 may have stored thereto (e.g., to a data storage device, such as random access memory (RAM), hard disk, optical disk drive, etc., which is communicatively accessible by capacity planner 101) serves configuration information 204, such as configuration information 103 in the example of FIG. 1. In this example, server configuration information 204 includes benchmark information for various different server configurations, such as the benchmark information described in U.S. Pat. No. 7,424,528. An objective of the basic benchmark according to one embodiment is to define how many concurrent streams of the same bit rate can be supported by the media server without degrading the quality of any streams.

In accordance with one embodiment, the basic benchmark comprises two types of benchmarks:
1) Single File Benchmark measuring a media server capacity when all the clients in the test workload are accessing the same file, and
2) Unique Files Benchmark measuring a media server capacity when each client in the test workload is accessing a different file.

Each of these benchmarks have a set of sub-benchmarks with media content encoded at a different bit rate (e.g., in above-mentioned performance study, the following six bit rates that represent the typical Internet audience were used: 28 Kb/s, 56 Kb/s, 112 Kb/s, 256 Kb/s, 350 Kb/s, and 500 Kb/s). Of course, the set of benchmarked encoding bit rates can be customized according to a targeted workload profile.

Thus, a Single File Benchmark (SFB) may be executed for each of various different encoding bit rates for files stored at a media server under evaluation. The SFB measures the media server capacity when all of the clients in the test are accessing the same file. That is, the result of the SFB for a particular encoding bit rate defines the maximum number of concurrent streams of a single file encoded at that particular bit rate that the media server can support. Example techniques for executing SFBs for a media server are described further in U.S. Pat. No. 7,424,528. In this example embodiment of FIG. 2, an SFB is determined for each of various different server configurations, and such SFB determined for each server configuration is included in the collection of benchmarks 204.

Similarly, a Unique Files Benchmark (UFB) may be executed for each of various different encoding bit rates for files stored at a media server under evaluation. The UFB measures the media server capacity when all of the clients in the test are accessing different files. That is, the result of a UFB for a particular encoding bit rate defines the maximum number of concurrent streams, each of different files that are encoded at the particular bit rate, that the media server can support. Example techniques for executing UFBs for a media server are described further in U.S. Pat. No. 7,424,528. In an example embodiment of FIG. 2, a UFB is determined for each of various different server configurations, and such UFB determined for each server configuration is included in the collection of benchmarks 204.

When all of a media server's clients are accessing a single file (as measured by the SFB), the media server is capable of serving the currently streamed bytes of the file from memory. However, when all of its clients are accessing a different file (as measured by the UFB), the media server serves each file from disk. Thus; the SFB is essentially a best-case scenario benchmark, whereas the UFB is essentially a worst-case scenario benchmark for a corresponding server configuration.

Using an experimental testbed with standard components available in a Utility Data Center environment and proposed set of basic benchmarks, the capacity and scaling rules of a media server running RealServer 8.0 from RealNetworks was measured in the L. Cherkasova Paper. The measurement results reported in the L. Cherkasova Paper show that these scaling rules are non-trivial. For example, the difference between the highest and lowest bit rate of media streams used in those experiments was 18 times. However, the difference in maximum number of concurrent streams a server is capable of supporting for corresponding bit rates is only around 9 times for an SFB, and 10 times for a UFB. Modern media servers, such as RealServer 8.0, rely on the native operating system's file buffer cache support to achieve higher application throughput when accessed files are streamed from memory. The measurements indicate that media server performance is 2.5-3 times higher under the SFB than under the UFB. This quantifies the performance benefits for multimedia applications when media streams are delivered from memory versus from disk.

Capacity planner 101 uses the benchmarks for the various different server configurations to evaluate those server configurations under the received workload information (e.g., the workload profile 203). For evaluating the capacity of a server configuration under the expected workload, certain embodiments of a capacity planner use a "cost" function for evaluating the amount of resources of the server configuration that are consumed under the workload. As described in U.S. Pat. No. 7,424,528 and in the L. Cherkasova Paper, a set of basic benchmark measurements for a server configuration may be used to derive a cost function that defines a fraction of system resources of such server configuration that are needed to support a particular media stream depending on the stream bit rate and type of access (memory file access or disk file access), including the following costs:

A) $cost_{X_i}^{disk}$—a value of cost function for a stream with disk access to a file encoded at $X_i$ Kb/s. If we define the media server capacity being equal to 1, the cost function is computed as $cost_{X_i}^{disk} = 1/N_{X_i}^{Unique}$, where $N_{X_i}^{Unique}$ is the maximum measured server capacity in concurrent streams under the UFB of the server configuration under consideration for a file encoded at $X_i$ Kb/s; and B) $cost_{X_i}^{memory}$—a value of cost function for a stream with memory access to a file encoded at $X_i$ Kb/s. Let $N_{X_i}^{single}$ be the maximum measured server capacity in concurrent streams under the SFB of the server configuration under consideration for a file encoded at $X_i$ Kb/s, then the cost function is computed as $cost_{X_i}^{memory} = (N_{X_i}^{Unique} - 1)/(N_{X_i}^{Unique} \times (N_{X_i}^{Single} - 1))$.

Let W be the current workload processed by a media server, where a) $X_w = X_1, \ldots X_{k_w}$ is a set of distinct encoding bit rates of the files appearing in $W (X_w \subseteq X)$;

b)
$$N_{X_{W_i}}^{memory}$$

is a number of streams having a memory access type for a subset of files encoded at $X_{W_i}$ Kb/s; and c)
$$N_{X_{W_i}}^{disk}$$

is a number of streams having a disk access type for a subset of files encoded at $X_{W_i}$ Kb/s.

Then, the service demand, "Demand," to a media server under workload W can be computed by the following capacity equation:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk} \quad (1)$$

If Demand≦1 then the media server operates within its capacity, and the difference 1—Demand defines the amount of available server capacity.

The same reasoning applies to the whole media site: using a media site traffic profile, capacity planner 101 can compute Demand the site needs to support using the cost functions of different media server configurations, and then compare the computed results. For example, for a server configuration of type 1 and the corresponding cost functions, the computed service demand is Demand=1.3, i.e. considered media traffic requires more than 1 node (e.g., 2 nodes) of type 1 for its support, and for another server configuration of type 2 and its corresponding cost functions the computed service demand is Demand=0.8, i.e. 1 node of type 2 can support the media site traffic.

The above-described cost function uses a single value to reflect the combined resource requirement such as CPU, bandwidth and memory to support a particular media stream depending on the stream bit rate and type of the file access (memory or disk access). The proposed framework provides a convenient mapping of a service demand (client requests) into the corresponding system resource requirements.

As mentioned with FIG. 2, a workload profile 203 that is based on the past workload history (e.g., access log) 201 of a service provider, may be generated by MediaProf 202 and used by capacity planner 101 in evaluating the capacity of one or more server configurations for supporting the service provider's workload. While it may be useful to understand how much traffic is serviced by the site in a particular time interval (e.g., per hour), this knowledge does not translate directly into capacity requirements for a proper media server configuration. For properly evaluating a server configuration's capacity for supporting a workload, information concerning the number of simultaneous (concurrent) connections and the corresponding peak bandwidth requirements may be used by capacity planner 101.

Figure 3A:
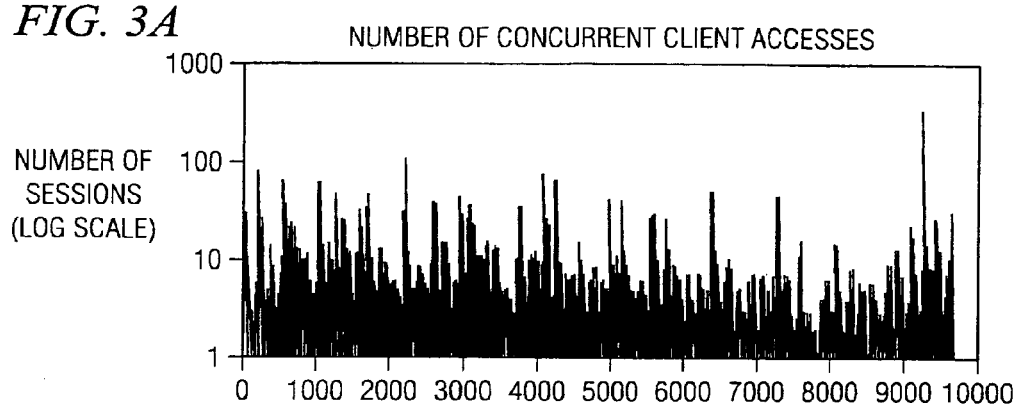
FIGS. 3A-3B show graphs illustrating the number of concurrent client sessions and the maximum bandwidth requirements for an example media site over a 1 year period of time.
Figure 3B:
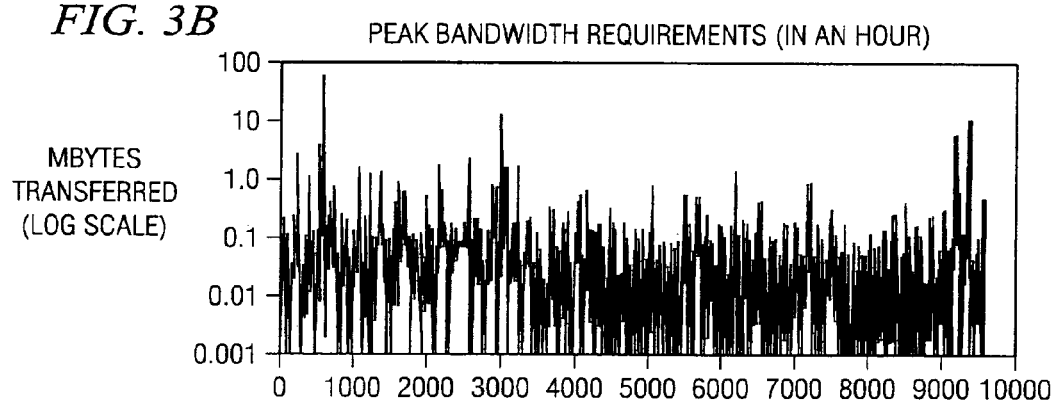

Access information reflected in access logs from an example media server supporting a Media Site "A" are now described as an example of access patterns that may occur at a service provider's site. This example access log is described further below in conjunction with FIGS. 3A-3B and 4A-4B. FIGS. 3A-3B show graphs illustrating the number of concurrent-client sessions and the maximum bandwidth requirements to Media Site A over the considered workload duration (e.g., a 1 year period of time is assumed in this example). (Note that the Y axes use a logscale for both FIGS. 3A and 3B). These numbers are typically significantly lower than the corresponding numbers of aggregate traffic per hour.

Figure 4A:
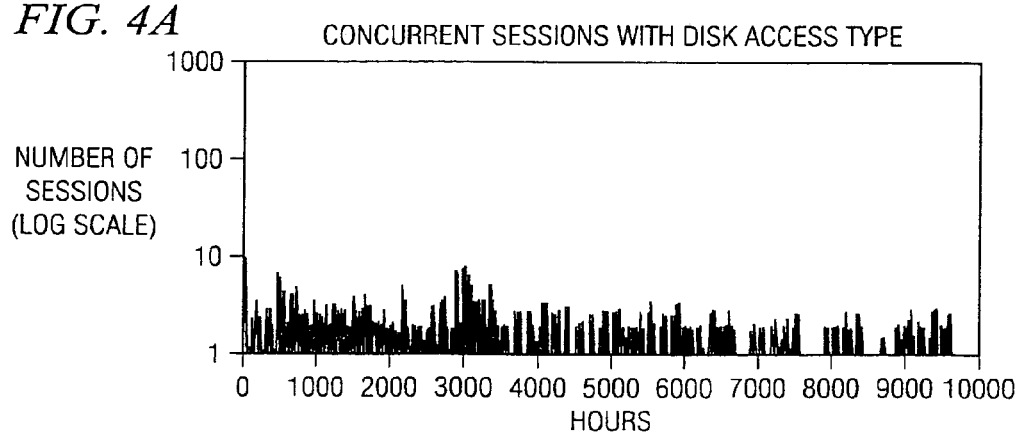
FIGS. 4A-4B show graphs illustrating the classification of client requests of the example media site of FIGS. 3A-3B into disk accesses (FIG. 4A) and memory accesses (FIG. 4B)
Figures 4B, 5:
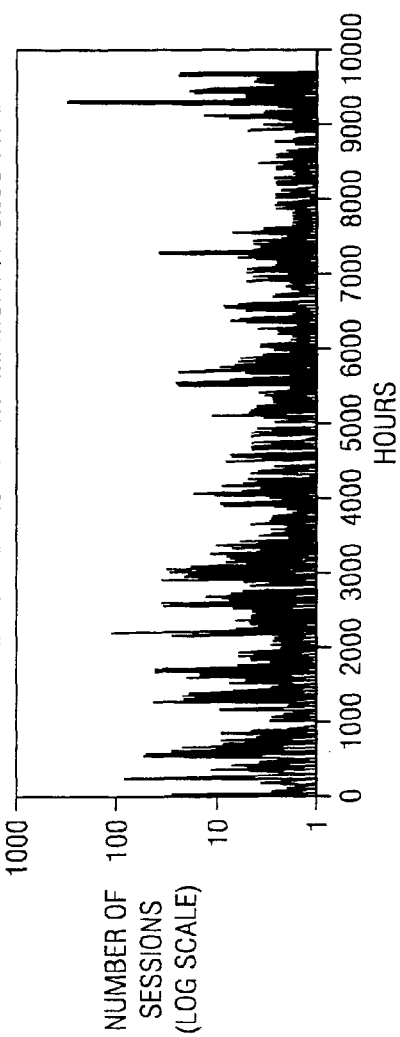
FIG. 5 shows an example workload profile that may be generated by a media profiler in accordance with one embodiment.

FIGS. 4A-4B show graphs illustrating the classification of client requests of the example Media Site A into disk accesses (FIG. 4A) and memory accesses (FIG. 4B) for client requests with encoding bit rates of 112-256 Kb/s, and a memory size of 1 GB (in this regard "memory size" means an estimate of what the server may use for file buffer cache). The results show that very large fraction of requests in this bit rate group can be served from memory. In particular, practically all the traffic bursts (or "spikes") can be served from memory as FIG. 4B shows. Since a media server capacity is typically 3-5 times higher when media streams are delivered from memory versus from disk, such a qualitative media traffic classification and analysis will directly translate in significant configuration savings.

Since the amount of system resources needed to support a particular client request depends on the file encoding bit rate as well the access type of the corresponding request, (i.e. different requests have a different resource "cost" as describe above), MediaProf 202 provides a corresponding classification of simultaneous connections in the generated workload profile 203. FIG. 5 shows an example workload profile 203 that may be generated by MediaProf 202. As shown, the example workload profile 203 of FIG. 5 includes various points in time for which access information was collected in the access log of workload 201, such as time T1. For each time point, the number of concurrent connections is identified. More specifically, the number of concurrent connections are categorized into corresponding encoding bit rates for the streaming media files accessed thereby. Further, the number of concurrent connections in each encoding bit rate category is further categorized into sub-categories of either memory or disk depending on whether the access was a memory access or a disk access. That is, MediaProf 202 may model whether a request in the workload can be serviced from memory or from disk for a given server configuration (e.g., a given memory size). For instance, the memory modeling technique disclosed in U.S. Pat. No. 7,310,681 titled "SYSTEM AND METHOD FOR MODELING THE MEMORY STATE OF A STREAMING MEDIA SERVER," may be used in certain embodiments. In certain implementations, MediaProf 202 may build different profiles for different memory sizes. Note that a memory access does not assume or require that the whole file resides in memory. For example, if there is a sequence of accesses to the same file issued closely to each other on a time scale, then the first access may read a file from disk, while the subsequent requests may be accessing the corresponding file prefix from memory. A technique that may be used by MediaProf 202 in determining whether an access is from memory or from disk is described further below in conjunction with FIG. 6.

In the example workload profile of FIG. 5, 30 concurrent connections (or client accesses) are in progress at time $T_1$ for the media site under consideration. The 30 concurrent connections are categorized into 3 accesses of media file(s) encoded at 28 Kb/s, 2 accesses of media file(s) encoded at 56

Kb/s, 3 accesses of media file(s) encoded at 112 Kb/s, 7 accesses of media file(s) encoded at 256 Kb/s, 5 accesses of media file(s) encoded at 350 Kb/s, and 10 accesses of media file(s) encoded at 500 Kb/s. Again, embodiments are not limited to the six encoding bit rate categories of the example of FIG. 5, but rather other encoding bit rates may be used instead of or in addition to those of FIG. 5 (e.g., as may be tailored for the service provider's site/workload). Further, the 3 accesses of media file(s) encoded at 28 Kb/s are further sub-categorized into 2 memory accesses and 1 disk access. The 2 accesses of media file(s) encoded at 56 Kb/s are further sub-categorized into 0 memory accesses and 2 disk accesses. The 3 accesses of media file(s) encoded at 112 Kb/s are further sub-categorized into 3 memory accesses and 0 disk accesses. The 7 accesses of media file(s) encoded at 256 Kb/s are further sub-categorized into 6 memory accesses and 1 disk access. The 5 accesses of media file(s) encoded at 350 Kb/s are further sub-categorized into 5 memory accesses and 0 disk accesses, and the 10 accesses of media file(s) encoded at 500 Kb/s are further sub-categorized into 8 memory accesses and 2 disk accesses.

Figure 6:
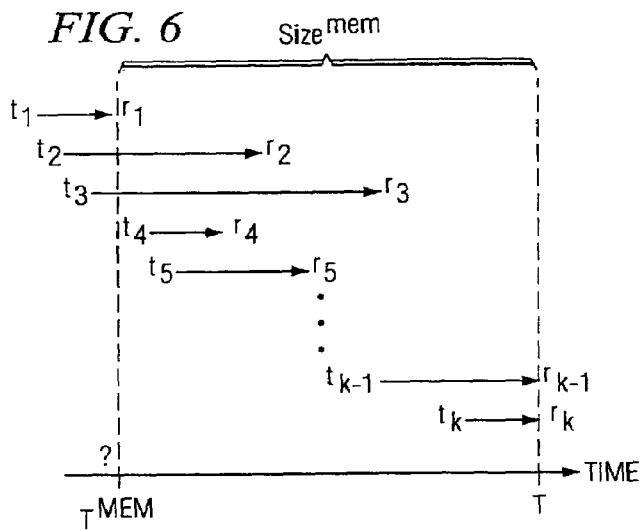
FIG. 6 shows an example of requests for file accesses that are made to a media server during an interval of time.

An example technique for MediaProf 202 determining an access type (i.e., whether memory or disk access) is described in conjunction with FIG. 6. Let $Size^{mem}$ be the size of memory in bytes of a server configuration under consideration. For each request r in the media server access log of workload 201, information is included about the media file requested by r, the duration of r in seconds, the encoding bit rate of the media file requested by r, the time t when a stream corresponding to request r is started (which is reflected by r(t) herein), and the time when a stream initiated by request r is terminated.

Let $r_1(t_1)$, $r_2(t_2)$, . . . , $r_k(t_k)$ be a recorded sequence of requests to a media server. Given the current time T and request r(T) to media file f, MediaProf 202 may compute some past time $T^{mem}$ such that the sum of the bytes stored in memory between $T^{mem}$ and T is equal to $Size^{mem}$. Accordingly, the files' segments streamed by the media server between times $T^{mem}$ and T will be in memory at time T. In this way, MediaProf 202 can identify whether request r will stream file f (or some portion of it) from memory for a given server configuration under consideration.

In the specific example shown in FIG. 6, requests for file accesses that are made to a media server during the interval of time $t_1$ through time T is shown, wherein the interval from time $T^{mem}$ through time T can be determined that comprises the segments of accessed files that are currently stored to the media server's memory, which has size $Size^{mem}$. More specifically, accesses $r_1, r_2, \ldots, r_{k-1}, r_k$ are made during the time interval from time $t_1$ through the current time T. As shown in the example of FIG. 6, the total size of the segments accessed is greater than the total size, $Size^{mem}$, of the media server's memory. Thus, depending on the type of memory management scheme implemented for the memory, some of the accessed segments are evicted from the memory. That is, not all of the accessed segments can be stored to memory because the segments' total size is greater than size $Size^{mem}$ of memory of the server configuration under consideration. Typically, a Least Recently Used:(LRU) scheme is implemented for a media server, wherein the most recently accessed segments are stored to memory and the oldest (or least recently accessed) segments are evicted to make room for more recently accessed segments to be stored in memory. To determine the current contents of memory at time T, the time interval from time $T^{mem}$ to the time T in which unique file segments that have a size totaling size $Size^{mem}$ is determined by MediaProf 202 from the workload information 201.

U.S. Pat. No. 7,310,681 further describes an example technique for modeling the memory state of a streaming media server, and such memory modeling technique may be employed by MediaProf 202 in certain embodiments for efficiently determining the memory state of a server configuration that is under consideration. That is, MediaProf 202 may use such memory modeling technique for modeling accesses of the workload 201 for a media server configuration under consideration to generate a workload profile 203, such as the example workload profile of FIG. 5.

In the example embodiment of FIG. 2, capacity planner 101 has a collection of benchmarked configurations 204 with the corresponding cost functions for different types of requests (i.e., requests serviced by memory versus requests serviced by disk). Capacity planner 101 receives the media site workload profile 203 (for a particular memory size) and using the cost functions of a particular media server configuration computes a corresponding service demand profile over time according to formula (1) above. The service demand profile is computed for different memory sizes and different benchmarked configurations. An example of such a service demand profile is described further below in conjunction with FIG. 7.

Figure 7:
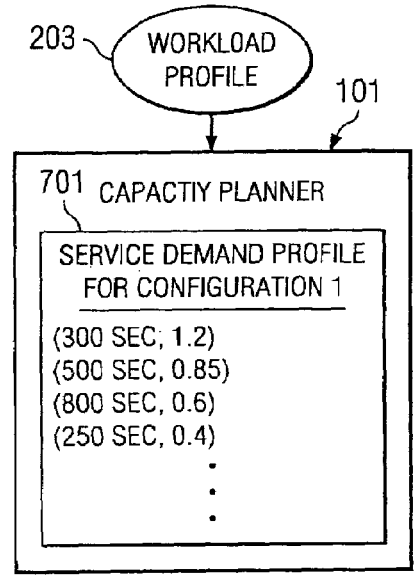
FIG. 7 shows an example service demand profile that may be computed by a capacity planner from a received workload profile in accordance with one embodiment.

FIG. 7 shows an example service demand profile 701 that may be computed by capacity planner 101 from the received workload profile 203. In this example, service demand profile 701 is a list of pairs. The first element of each pair represents a time duration (e.g. 300 seconds in the first pair of example service demand profile 701). The second element of each pair reflects the service demand (or resource "cost") computed by capacity planner 101 for the corresponding time duration for a server configuration under consideration (such as server "configuration 1" in the example of FIG. 7). In the example service demand profile 701, the first pair has a service demand of 1.2 for 300 seconds, the second pair provides that a service demand 0.85 was encountered for 500 seconds, and so on. A service demand greater than 1 (e.g., 1.2 for the first pair of service demand profile 701) means that more than 1 of the server configurations under consideration were required for supporting the workload for a corresponding amount of time (e.g., at least 2 of the "configuration 1" servers are needed for supporting 300 seconds of the received workload 203 in the example of the first pair of the service demand profile 701 of FIG. 7). In other words, the service configuration under consideration was overloaded for the corresponding period of time for which the capacity planner computes that the service demand in supporting workload 203 is greater than 1. The second pair of service demand profile 701, (300 sec, 0.6), identifies that for 300 sec of the received workload 203, one server having the "configuration 1" under consideration is capable of supporting such workload, and the server under consideration is utilized during this time at 60% capacity.

The service demand profile may be ordered by the service demand information (i.e., the second element of the pairs in the example of FIG. 7) from greatest service demand to least service demand. In this case, the top pairs in the service demand profile represent the peak load demands for the considered server configuration under the received workload 203, as well as the corresponding time duration for these peak loads over time. Since workload measurements of existing media services indicate that client demands are highly variable (the "peak-to-mean" ratio may be an order of magnitude), it might not be economical to over-provision the future system using the past "peak" demand. That is, a server configuration that fails to support the workload for a relatively small period of time (e.g., during "peak" demands or "bursts" of client accesses) may still be a suitable and/or most cost-effective configuration for a service provider to implement. As described above, a service provider can specify service parameters 104, such as SLAs 104$_A$ and/or constraints 104$_B$, which may be used by capacity planner 101 in evaluating the service demand profile 701 to determine whether the server configuration under consideration is capable of supporting the expected workload in accordance with the specified service parameters 104. For example, an SLA 104$_A$ may be defined by a service provider to specify that a server configuration is desired that is capable of supporting the expected workload at least 99% of the time. Using the computed service demand profile 701, the capacity planner 101 may determine the maximum load requirements corresponding to the 99-th percentile of all the service demands for a server configuration under consideration over time (under the expected workload). This service demand is denoted herein as Demand$_{SLA}$.

Additionally, in some instances, a service provider may wish to obtain a server configuration with planned "spare" capacity for future growth, such as may be specified as constraints 104$_B$. For instance, constraints 104B may specify that a server configuration is desired that is utilized under 70% of its available capacity for at least 90% of the time in supporting the workload 203. Thus, using the computed service demand profile 701, the capacity planner finds the maximum load requirements corresponding to the 90-th percentile of all the service demands for a server configuration under consideration over time (under the expected workload 203). For example, if the service demand corresponding to 90-th percentile is 3.5, then the requirements to configuration utilized under 70% of its available capacity will be 3.5/0.7=5. This service demand is denoted herein as Demand$_{Constraints}$.

In this example, capacity planner 101 may determine a desirable performance requirements as Demand$_{overall}$=max (Demand$_{SLA}$, Demand$_{Constraints}$) rounded up to the closest integer. In some instances, there may be multiple server configurations satisfying the specified performance requirements. Taking into consideration the monetary price information of the corresponding configurations, the best cost/performance solution can be determined by capacity planner 101.

Turning to FIG. 8, an example implementation of one embodiment for evaluating capacities of a plurality of different server configurations for handling an expected workload is shown. As shown, server configuration information 805 for a first server configuration ("server configuration$_1$"), server configuration information 806 for a second server configuration ("server configuration$_2$"), and server configuration information 807 for a third server configuration ("server configuration$_3$") are available. MediaProf 202 receives workload information 201, and generates workload profile 203 for each of server configuration$_1$, server configuration$_2$, and server configuration$_3$. That is, a workload profile 203, such as described with FIG. 5, is generated by MediaProf 202 for each of the three server configurations under consideration. The generated workload profile 203 is input to capacity planner 101, which processes it in the example manner described further below.

In this example implementation, capacity planner 101 uses a corresponding resource "cost" function 801 to process the received workload profile 203 for server configuration$_1$. Similarly, a corresponding cost function for server configuration$_2$ and server configuration$_3$ may be used for processing the workload profiles of those configurations. The cost function 801 is used to generate a service demand profile 802 for server configuration$_1$, such as the example service demand profile described above with FIG. 7. Capacity planner 101 uses service demand profile 802 to evaluate whether server configuration$_1$ has sufficient capacity for supporting the expected workload in a desired manner (e.g., in accordance with received service parameters 104), such as shown in operation 803 in the example of FIG. 8. In operational block 804, capacity planner 101 may compare the determined capacities for each of server configuration$_1$, server configuration$_2$, and server configuration$_3$ to determine the optimal one of those configurations to be selected for supporting the expected workload.

FIG. 9 shows an operational flow diagram of one embodiment for using a capacity planning tool, such as capacity planner 101. As shown, operational block 901 receives configuration information for at least one streaming media server into a capacity planning tool. Operational block 902 receives into the capacity planning tool workload information for a workload of client accesses of streaming files from a server. In operational block 903, the capacity planning tool evaluates a capacity of the at least one streaming media server for supporting the workload.

Figure 10:
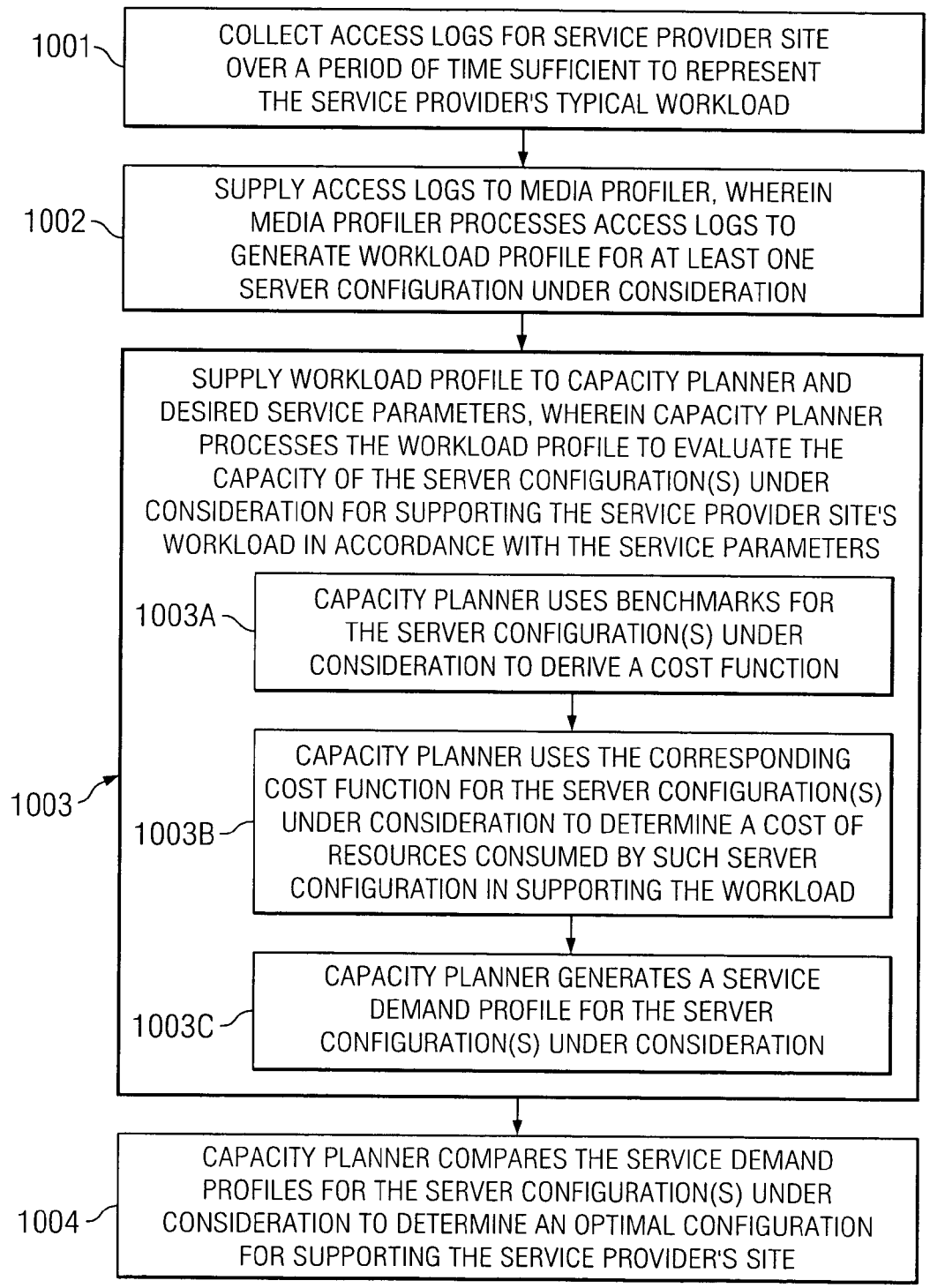
FIG. 10 shows an operational flow diagram of an example implementation of an embodiment for evaluating capacity of one or more server configurations for supporting an expected workload of a service provider.

FIG. 10 shows an operational flow diagram of an example implementation of an embodiment for evaluating capacity of one or more server configurations for supporting an expected workload of a service provider. In operational block 1001, access logs are collected for a service provider site over a period of time sufficient to represent the service provider's typical workload. In operational block 1002, the access logs are supplied to a media profiler, and the media profiler process the access logs to generate a workload profile for at least one server configuration under consideration. In operational block 1003, the workload profile generated by the workload profiler is supplied to a capacity planner, and the capacity planner is supplied desired service parameters. The capacity planner processes the workload profile to evaluate the capacity of the server configuration(s) under consideration for supporting the service provider site's workload in accordance with the desired service parameters.

In performing operational block 1003, the capacity planner may, in certain implementations, perform the operations 1003$_A$, 1003$_B$, and 1003$_C$, as shown in the example of FIG. 10. For instance, the capacity planner may, in block 1003$_A$, use benchmarks for the server configuration(s) under consideration to derive a cost function for such server configuration(s). In block 1003$_B$, the capacity planner may use the corresponding cost function for the server configuration(s) under consideration to determine a cost of resources consumed by the corresponding server configuration(s) in supporting the workload. And, in block 1003$_C$, the capacity planner may generate a service demand profile for the server configuration(s) under consideration.

In block 1004, the capacity planner may, in some instances, use the generated service demand profiles for comparing the server configurations under consideration to determine an optimal configuration for supporting the service provider's site.

When implemented via computer-executable instructions, various elements of embodiments described herein for evaluating server configuration(s)' capacity for supporting an expected workload are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 11:
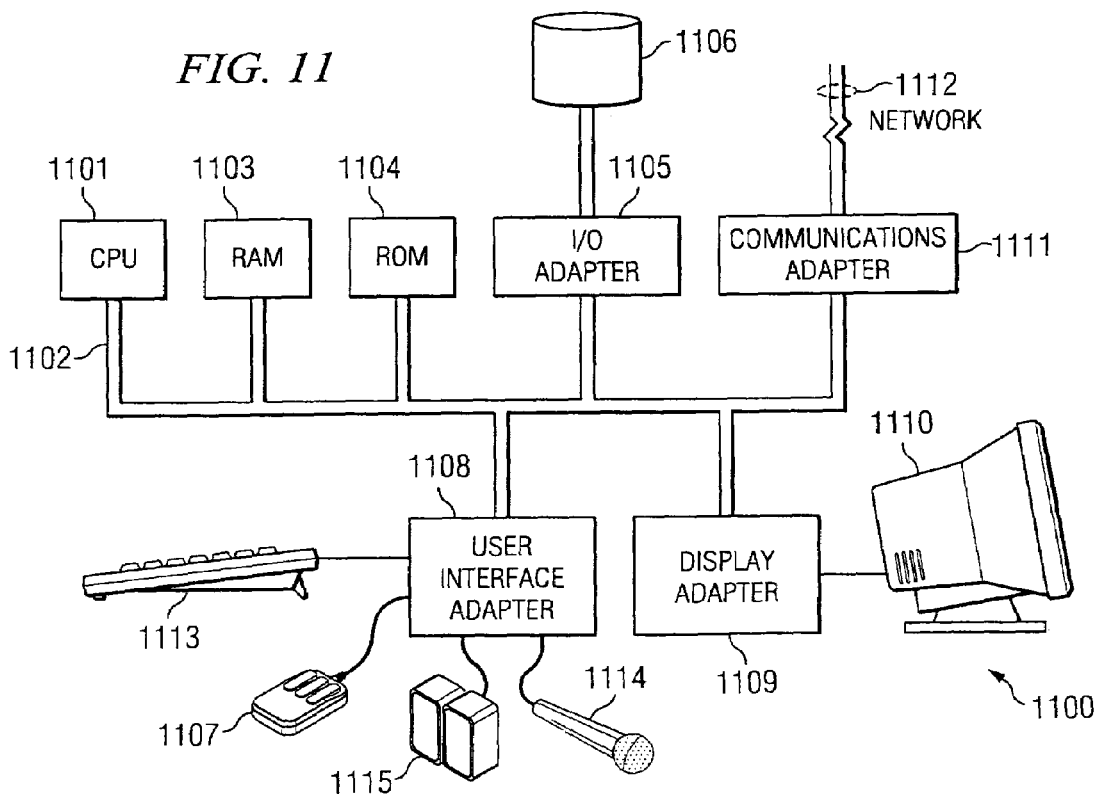
FIG. 11 shows an example computer system adapted to provide an embodiment of a server capacity-evaluator.

FIG. 11 illustrates an example computer system 1100 adapted according to an embodiment for evaluating server configuration(s)' capacity for supporting an expected workload. That is, computer system 1100 comprises an example system on which embodiments described herein may be implemented. Central processing unit (CPU) 1101 is coupled to system bus 1102. CPU 1101 may be any general purpose CPU. The present invention is not restricted by the architecture of CPU 1101 as long as CPU 1101 supports the inventive operations as described herein. CPU 1101 may execute the various logical instructions according to embodiments described herein. For example, CPU 1101 may execute machine-level instructions according to the exemplary operational flows described above in conjunction with FIGS. 9 and 10.

Computer system 1100 also preferably includes random access memory (RAM) 1103, which may be SRAM, DRAM, SDRAM, or the like. Computer system 1100 preferably includes read-only memory (ROM) 1104 which may be PROM, EPROM, EEPROM, or the like. RAM 1103 and ROM 1104 hold user and system data and programs, as is well known in the art.

Computer system 1100 also preferably includes input/output (I/O) adapter 1105, communications adapter 1111, user interface adapter 1108, and display adapter 1109. I/O adapter 1105, user interface adapter 1108, and/or communications adapter 1111 may, in certain embodiments, enable a user to interact with computer system 1100 in order to input information thereto.

I/O adapter 1105 preferably connects storage device(s) 1106, such as one or more of hard drive, compact disc (CD) drive, floppy disk drive, tape drive, etc. to computer system 1100. The storage devices may be utilized when RAM 1103 is insufficient for the memory requirements associated with storing data for application programs. RAM 1103, ROM 1104, and/or storage devices 1106 may be used for storing computer-executable code for evaluating the capacity of a server configuration in accordance with the embodiments described above. Communications adapter 1111 is preferably adapted to couple computer system 1100 to network 1112.

User interface adapter 1108 couples user input devices, such as keyboard 1113, pointing device 1107, and microphone 1114 and/or output devices, such as speaker(s) 1115 to computer system 1100. Display adapter 1109 is driven by CPU 1101 to control the display on display device 1110.

It shall be appreciated that the present invention is not limited to the architecture of system 1100. For example, any suitable processor-based device may be utilized, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments described above.

What is claimed is:

1. A method comprising:

receiving, into a capacity planning tool executed in a computer system, configuration information for at least one streaming media server, wherein the configuration information comprises a single file benchmark and a unique file benchmark for the at least one streaming media server, wherein the single file benchmark measures a streaming media server capacity when all clients in a test workload are accessing a single file, and wherein the unique file benchmark measures the streaming media server capacity when each client in the test workload is accessing a different file;

receiving, into said capacity planning tool, workload information for a workload of client accesses of streaming media files from a server; and said capacity planning tool evaluating, based on said configuration information, a capacity of the at least one streaming media server for supporting the workload.

2. The method of claim 1 wherein said configuration information includes identification of size of memory of said at least one streaming media server.

3. The method of claim 2 wherein said configuration information further includes disk configuration of said at least one streaming media server.

4. The method of claim 1 wherein said workload information includes identification of number of concurrent client accesses of said streaming media files over a period of time.

5. The method of claim 4 wherein said workload information further includes identification of a corresponding encoding bit rate of each of said streaming media files accessed.

6. The method of claim 1 wherein said workload information comprises information from an access log collected over a period of time.

7. The method of claim 1 wherein said evaluating comprises:

computing a cost corresponding to resources of said at least one streaming media server that are consumed in supporting the workload.

8. The method of claim 7 wherein said computing said cost comprises:

computing a cost of consumed resources for a stream in said workload having a memory access to a streaming media file; and computing a cost of consumed resources for a stream in said workload having a disk access to a streaming media file.

9. The method of claim 1 wherein said evaluating comprises:

computing a service demand for said at least one streaming media server supporting said workload.

10. A method comprising:

receiving, into a capacity planning tool executed in a computer system, configuration information for at least one streaming media server;

receiving, into said capacity planning tool, workload information for a workload of client accesses of streaming media files from a server;

said capacity planning tool evaluating a capacity of the at least one streaming media server for supporting the workload;

wherein said evaluating comprises computing a service demand for said at least one streaming media server supporting said workload; and wherein said computing said service demand comprises computing:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk},$$

wherein the workload W comprises $X_W = X_1, \ldots, X_{k_w}$ set of different encoded bit rates of files served in the workload, $$N_{X_{W_i}}^{memory}$$

is a number of streams in the workload having a memory access to a subset of files encoded at $X_{W_i}$ Kb/s, $$cost_{X_{W_i}}^{memory}$$

is a cost of consumed resources for a stream having a memory access to a file encoded at $X_{W_i}$ Kb/s, $$N_{X_{W_i}}^{memory}$$

is a number of streams in the workload having a disk access to a subset of files encoded at $X_{W_i}$ Kb/s, and $$cost_{X_{W_i}}^{memory}$$

is a cost of consumed resources for a stream having a disk access to a file encoded at $X_{W_i}$ Kb/s.

11. The method of claim 1 further comprising:
receiving at least one service parameter.

12. The method of claim 11 wherein said at least one service parameter comprises information identifying at least one performance criteria desired to be satisfied by said at least one streaming media server under the workload.

13. The method of claim 12 wherein said at least one performance criteria specifies a minimum percentage of time that said at least one streaming media server is desired to be capable of supporting the workload.

14. The method of claim 11 wherein said at least one service parameter comprises information identifying a constraint.

15. The method of claim 11 wherein said evaluating further comprises:
evaluating whether said at least one streaming media server satisfies said at least one service parameter.

16. Computer-executable software code stored to a computer-readable medium, the computer-executable software code comprising:
code executable in a computer system for receiving workload information for a workload of client accesses of streaming media files from a server; and
code executable in the computer system for employing a cost function derived for at least one system configuration from a single file benchmark and a unique file benchmark for evaluating a capacity of the at least one system configuration for supporting the workload, wherein the single file benchmark measures a streaming media server capacity when all clients in a test workload are accessing a single file, and wherein the unique file benchmark measures the streaming media server capacity when each client in the test workload is accessing a different file.

17. Computer-executable software code of claim 16 further comprising:
code executable in the computer system for receiving configuration information for said at least one system configuration.

18. Computer-executable software code of claim 16 wherein said code for evaluating a capacity of at least one system configuration for supporting the workload comprises:
code for determining whether said at least one system configuration is capable of supporting said workload in accordance with at least one service parameter.

19. Computer-executable software code of claim 18 wherein said at least one service parameter comprises information identifying at least one performance criteria desired to be satisfied by said at least one system configuration under the workload.

20. Computer-executable software code of claim 16 further comprising:
code executable in the computer system for generating a workload profile for the received workload information.

21. Computer-executable software code of claim 20 wherein the received workload information comprises an access log collected over a period of time.

22. Computer-executable software code of claim 20 wherein said workload profile comprises:
for a plurality of different points in time, identification of a number of concurrent client accesses, wherein the number of concurrent client accesses are categorized into corresponding encoding bit rates of streaming media files accessed thereby and are further sub-categorized into either memory or disk accesses.

23. Computer-executable software code of claim 16 wherein said code for evaluating comprises:
code for generating a service demand profile for said at least one system configuration.

24. Computer-executable software code of claim 16 wherein said code for evaluating a capacity of at least one system configuration comprises:
code for evaluating a capacity of a plurality of different system configurations and determining an optimal one of said plurality of different system configurations for supporting the workload.

25. A system comprising:
means for receiving configuration information for a plurality of different system configurations, wherein the configuration information comprises, for each of the plurality of different system configurations, a corresponding single file benchmark and unique file benchmark, wherein said single file benchmark measures capacity of the corresponding system configuration for serving a population of clients that all access a same file, wherein said unique file benchmark measures capacity of the corresponding system configuration for serving a population of clients that all access different files;
means for receiving workload information for a workload of client accesses of streaming media files from a server; and
means for evaluating, based on the configuration information, the capacity of each of said plurality of different system configurations for supporting said workload.

26. The system of claim 25 further comprising:
means for determining an optimal one of said plurality of different system configurations for supporting said workload.

27. The system of claim 26 wherein said means for determining an optimal one of said plurality of different system configurations for supporting said workload determines a most cost-effective one of said plurality of different system configurations for supporting said workload according to determined service parameters.

28. The method of claim 1 further comprising:
deriving, by said capacity planning tool, from the single file benchmark and unique file benchmark, a cost function for measuring the capacity of the at least one streaming media server for supporting the workload.

29. The method of claim 1 wherein said evaluating comprises computing a service demand for said at least one streaming media server supporting said workload; and
wherein said computing said service demand comprises computing:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk},$$

wherein the workload W comprises $X_W = X_1, \ldots, X_{k_w}$ set of different encoded bit rates of files served in the workload, $$N_{X_{W_i}}^{memory}$$

is a number of streams in the workload having a memory access to a subset of files encoded at $X_{W_i}$ Kb/s, $$cost_{X_{W_i}}^{memory}$$

is a cost of consumed resources for a stream having a memory access to a file encoded at $X_{W_i}$ Kb/s, $$N_{X_{W_i}}^{disk}$$

is a number of streams in the workload having a disk access to a subset of files encoded at $X_{W_i}$ Kb/s, and $$cost_{X_{W_i}}^{disk}$$

is a cost of consumed resources for a stream having a disk access to a file encoded at $X_{W_i}$ Kb/s.

30. A method executable by a computer system, comprising:
determining results of a single file benchmark for each of a plurality of encoding bit rates of a single file served by at least a first streaming media server configuration, wherein the result of the single file benchmark for a given encoding bit rate identifies the maximum number of concurrent streams of the single file that the at least a first streaming media server configuration can supply to a population of clients at the given encoding bit rate;
determining results of a unique file benchmark for each of said plurality of encoding bit rates, wherein the result of the unique file benchmark for a given encoding bit rate identifies the maximum number of concurrent streams of different files that the at least a first streaming media server configuration can supply to the population of clients at the given encoding bit rate;
deriving, from the results of the single file benchmark and unique file benchmark, a cost function;
receiving, into a capacity planning tool, workload information for a workload of client accesses of streaming media files from a server; and
using, by the capacity planning tool, the cost function for said at least a first streaming media server configuration for evaluating a capacity of the at least a first streaming media server configuration for supporting the workload.

* * * * *

UNITED STATES PATENT AND TRADEMARK OFFICE
CERTIFICATE OF CORRECTION

PATENT NO. : 7,610,381 B2  Page 1 of 1
APPLICATION NO. : 10/660978
DATED : October 27, 2009
INVENTOR(S) : Cherkasova et al.

It is certified that error appears in the above-identified patent and that said Letters Patent is hereby corrected as shown below:

In column 17, line 17, in Claim 10, delete " $N^{memory}_{x_{w_i}}$ " and insert -- $N^{disk}_{x_{w_i}}$ --, therefor.

In column 17, line 25, in Claim 10, delete " $cost^{memory}_{x_{w_i}}$ " and insert -- $cost^{disk}_{x_{w_i}}$ --, therefor.

Signed and Sealed this

Ninth Day of February, 2010

David J. Kappos
*Director of the United States Patent and Trademark Office*